(12) United States Patent
Manoj

(10) Patent No.: US 7,500,052 B2
(45) Date of Patent: Mar. 3, 2009

(54) QUICK DRIVE REPLACEMENT DETECTION ON A LIVE RAID SYSTEM

(75) Inventor: Jose K. Manoj, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 353 days.

(21) Appl. No.: 11/014,641

(22) Filed: Dec. 16, 2004

(65) Prior Publication Data

US 2006/0143504 A1 Jun. 29, 2006

(51) Int. Cl.
G06F 12/00 (2006.01)
G06F 13/00 (2006.01)
G06F 13/28 (2006.01)

(52) U.S. Cl. .................. 711/114; 711/100; 711/167

(58) Field of Classification Search .................. 711/114
See application file for complete search history.

(56) References Cited

U.S. PATENT DOCUMENTS

| 5,101,492 A * | 3/1992 | Schultz et al. ................. 714/7 |
| 6,178,520 B1 * | 1/2001 | DeKoning et al. ............. 714/5 |
| 6,496,914 B1 * | 12/2002 | Vook et al. .................. 711/170 |
| 6,845,466 B2 * | 1/2005 | Gold ............................. 714/7 |

* cited by examiner

Primary Examiner—Hyung S Sough
Assistant Examiner—Gary W Cygiel
(74) Attorney, Agent, or Firm—Christopher P. Morrison, PC

(57) ABSTRACT

An apparatus comprising a disk array and a controller. The disk array may be configured to send and receive data from the controller. The disk array generally comprises a plurality of disk drives each configured to store a drive signature. The controller may be configured to (i) receive a data signal and one or more address signals and (ii) present data to the disk array.

20 Claims, 4 Drawing Sheets

QUICK DRIVE REPLACEMENT DETECTION ON A LIVE RAID SYSTEM

FIELD OF THE INVENTION

The present invention relates to drive arrays generally and, more particularly, to a method and/or apparatus for implementing quick drive replacement detection on a live RAID system.

BACKGROUND OF THE INVENTION

In a live RAID (redundant array of inexpensive drives) system a user expects to be able to replace a drive while the system is online. However, if a driver for the array does not recognize the drive change, data corruption can result. RAID controllers without drive insertion/removal hardware support are particularly susceptible to such corruption.

Conventional RAID drivers depend on a reset routine or an IO monitor timeout routine in order to detect a drive removal. In a system with soft RAID drivers, there is no way to detect the drive change on a live RAID system if the replacement is done before the reset or IO monitor routine times out.

With conventional approaches, a user has to wait until the driver detects the drive removal, which is normally more than a minute considering all the drivers involved. Only after the RAID system detects the drive removal can a user safely insert a new drive. If the new drive is inserted before driver detects the old drive removal, then the system will function as if nothing happened and will result in data corruption.

It would be desirable to implement a drive replacement system that may be used in a RAID system that does not rely on a user to wait for the system before inserting a new drive.

SUMMARY OF THE INVENTION

The present invention concerns an apparatus comprising a disk array and a controller. The disk array may be configured to send and receive data from the controller. The disk array generally comprises a plurality of disk drives each configured to store a drive signature. The controller may be configured to (i) receive a data signal and one or more address signals and (ii) present data to the disk array.

The objects, features and advantages of the present invention include providing a drive replacement system that may (i) be used in a live RAID system, and/or (ii) allow drive replacement without relying on a user to wait for a certain amount of time before inserting a new drive.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
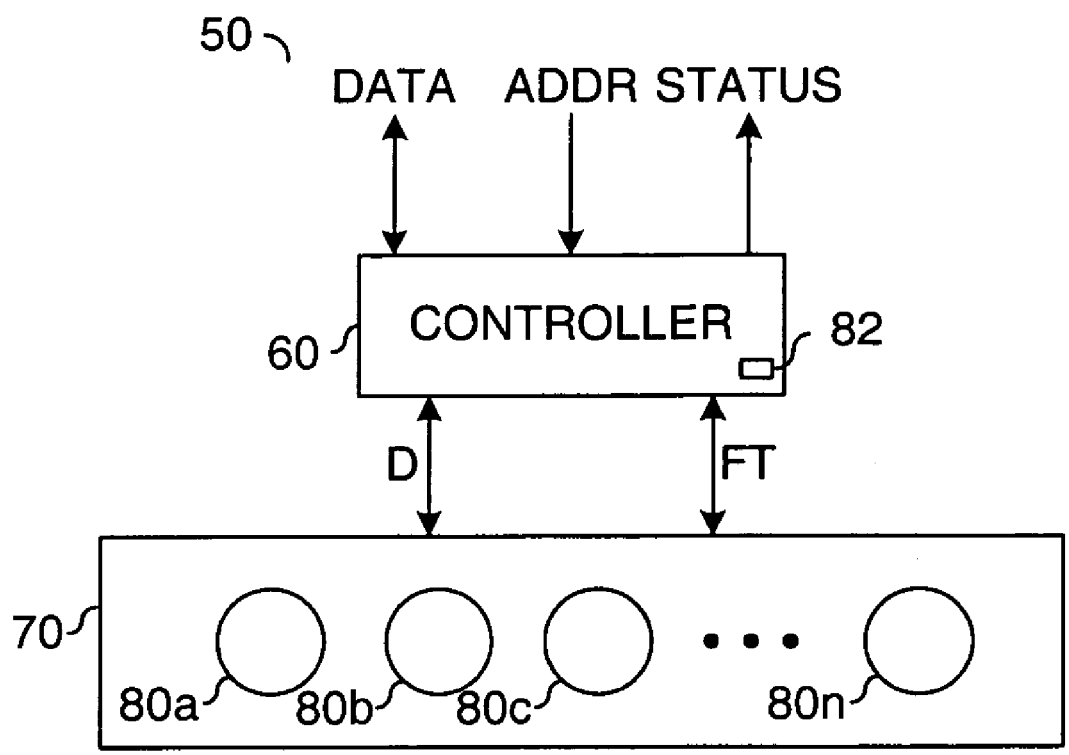
FIG. 1 is a block diagram illustrating a context of the present invention.

Referring to FIG. 1, a block diagram of an example implementation of a disk array apparatus 50 is shown. The apparatus 50 generally comprises a circuit (or device) 60 and a circuit (or device) 70. The circuit 60 may be implemented as a disk array controller. The circuit 70 may be implemented as a disk array (e.g., a RAID configuration). The circuit 70 generally includes a number of individual drives 80a-80n. While four drives 80a-80n are shown, the particular number of drives may be varied to meet the design criteria of a particular implementation. A chip 82 may be implemented within the controller 60 to store instructions for implementing the present invention. For example, the chip 82 may be configured to hold a computer readable medium configured to implement a number of steps. The chip 82 may be implemented as an integrated circuit (IC), such as an application specific integrated circuit (ASIC).

A signal (e.g., DATA) may transfer data items to and from the controller 60. A signal (e.g., ADDR) may transfer an address associated with the data to the controller 60. One or more optional signals (e.g., STATUS) may present status information from the controller 60. One or more signals (e.g., D) may exchange the data items between the controller 60 and the disk array 70. One or more signals (e.g., FT) may exchange fault tolerance items between the controller 60 and the disk array 70.

The controller 60 may be operational to map the information in the signal DATA to the individual disk drives 80a-80n within the disk array 70. The mapping may be dependent on the particular configuration of the disk drives 80a-80n that make up the disk array 70. The disk array 70 may be configured as a level 1 RAID, a level 5 RAID, a level 6 RAID, a level 10 RAID or a level 0+1 RAID. Other RAID configurations may be implemented to meet the criteria of a particular application.

The signal DATA may carry user data and other data to and from the apparatus 50. The data items within the signal DATA may be arranged in blocks, segments or other configurations. Addressing for the data items may be performed in the signal ADDR using logical blocks, sectors, cylinders, heads, tracks or other addressing scheme suitable for use with the disk drives 80a-80n. The signal STATUS may be deasserted (e.g., a logical FALSE level) when error detection circuitry within the controller 60 detects an error in the data read from the disk array 70. In situations where no errors are detected, the signal STATUS may be asserted (e.g., a logical TRUE level).

The signal D may carry the data information. The data information may be moved as blocks or stipes to and from the disk array 70. The signal FT may carry fault tolerance information related to the data information. The fault tolerant information may be moved as blocks or stipes to and from the disk array 70. In one embodiment, the fault tolerant information may be mirrored (copied) versions of the data information. In another embodiment, the fault tolerance information may include error detection and/or error correction items, for example parity values.

Figure 2:
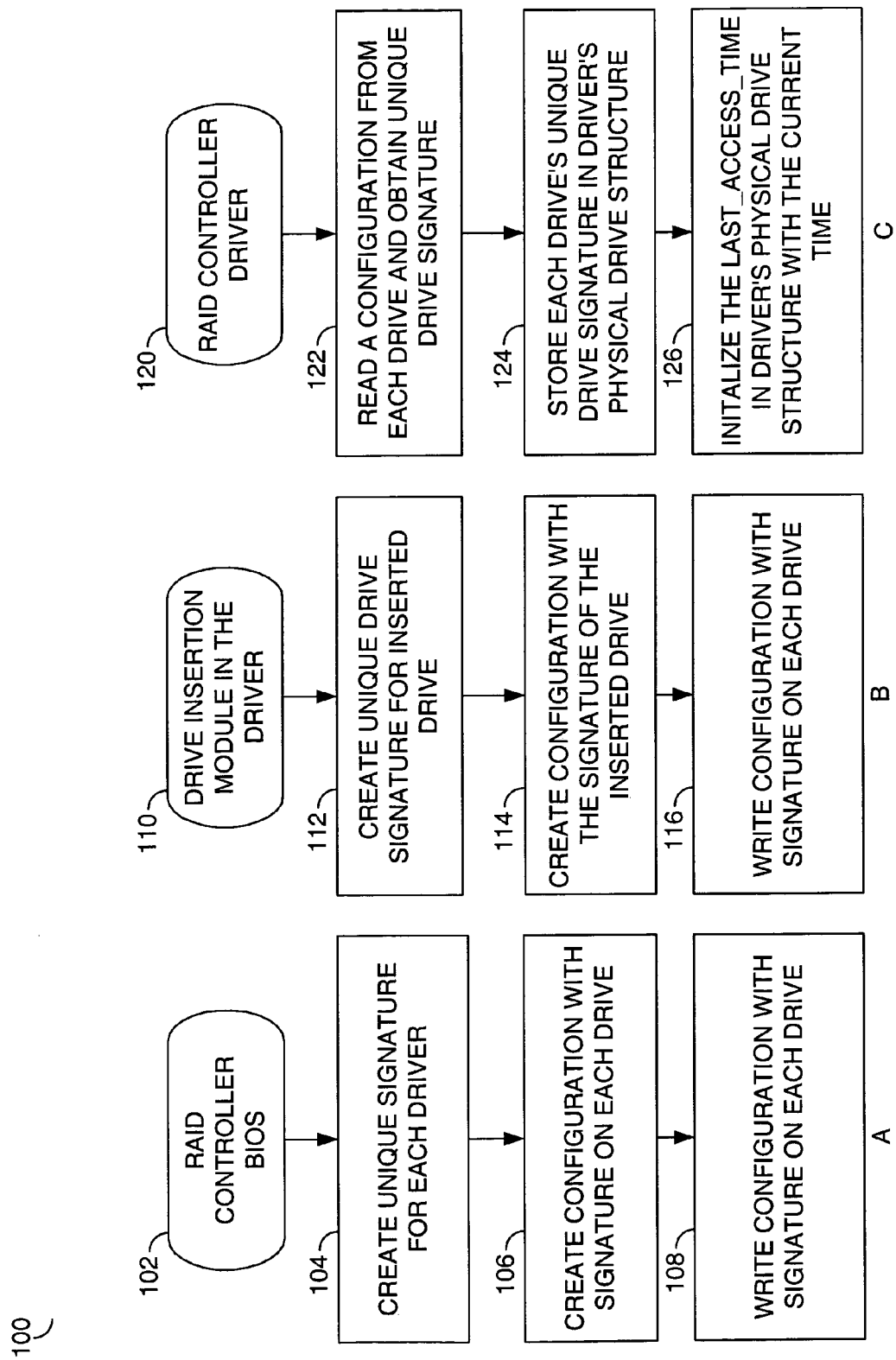
FIG. 2 is a flow diagram illustrating an embodiment of the present invention.

Referring to FIG. 2, a flow diagram of a process 100 is shown in accordance with a preferred embodiment of the present invention. The process 100 generally comprises a first section A, a second section B, and a third section C. The sections A, B and C represent processes stored in the chip 82 that may be used by the controller 60. The section A implements a driver unique signature creation section. The section A generally writes such a drive unique signature on each drive that is in the BIOS of the system 50. The BIOS may be stored in the chip 82, or may be stored in another chip (not shown) within the controller 60. The section B reads and stores the driver unique signature. The section C also reads and stores the driver unique signature.

The section A generally comprises a block (or section) 102, a block (or section) 104, a block (or section) 106 and a block (or section) 108. The block 102 generally represents the BIOS (basic input/output subroutines) of the RAID controller 60. The block 104 generally creates a unique signature for of the each drives 80a-80n. The block 106 generally creates a configuration with a signature on each of the drives 80a-80n. The block 108 generally writes the configuration with the signature to each of the drives 80a-80n.

The section B generally comprises a block (or section) 110, a block (or section) 112, a block (or section) 114 and a block (or section) 116. The block 110 represents a drive insertion module to be included in the driver. The block 112 generally creates a unique drive signature for each of the inserted drives 80a-80n. The disk array 70 generally has a number of drive enclosures to hold the drives 80a-80n. Each drive enclosure may or may not hold one of the drives 80a-80n. If a particular enclosure holds one of the drives 80a-80n, the drive is considered to be inserted. The block 114 generally creates a configuration with the drive signature of one of the inserted drives 80a-80n. The block 116 generally creates a write configuration with a signature for each of the drives 80a-80n.

The section C generally comprises a block (or section) 120, a block (or section) 122, a block (or section) 124 and a block (or section) 126. The block 120 generally represents a RAID controller driver. The block 122 generally reads a configuration from each of the drives 80a-80n to obtain a unique driver signature. The block 124 generally stores a unique drive signature for each of the drives 80a-80n in a physical drive structure of each of the drives 80a-80n. The block 126 generally initializes a parameter (e.g., last_access_time) in the physical drive structure of one of the drives 80a-80n. The parameter last_access_time is normally updated with the current time.

A driver implemented with the present invention may greatly reduce and/or eliminate the possibility of a drive change being made without awareness by the driver. The present invention implements a unique drive signature for each of the drives 80a-80n. The drive signature is normally stored along with RAID configuration data on each of the drives 80a-80n. The unique drive signature may be created by any method, but may normally be implemented by the BIOS of the controller 60 when a new configuration created or by the driver when a new drive is inserted. In one example, a 16-bit string signature made of an adapter model, a drive model, a slot number and the time when the configuration was created may be implemented. Such a string signature may avoid two of the drives 80a-80n having the same unique drive signature on two different configurations. Such a unique drive signature is normally created for the particular drives 80a-80n which are inserted while the system 50 is running.

When loading, the driver normally reads the unique drive signatures of each of the drives 80a-80n and stores the signatures in a parameter (e.g., physical_drive_data) structure for the driver. The parameter physical_drive_data generally represents a parameter of the physical drive structure that may be later used by the driver. The driver should also initialize the parameter physical_drive_data and the parameter last_access_time with the time when the drive signature was read.

Figure 3:
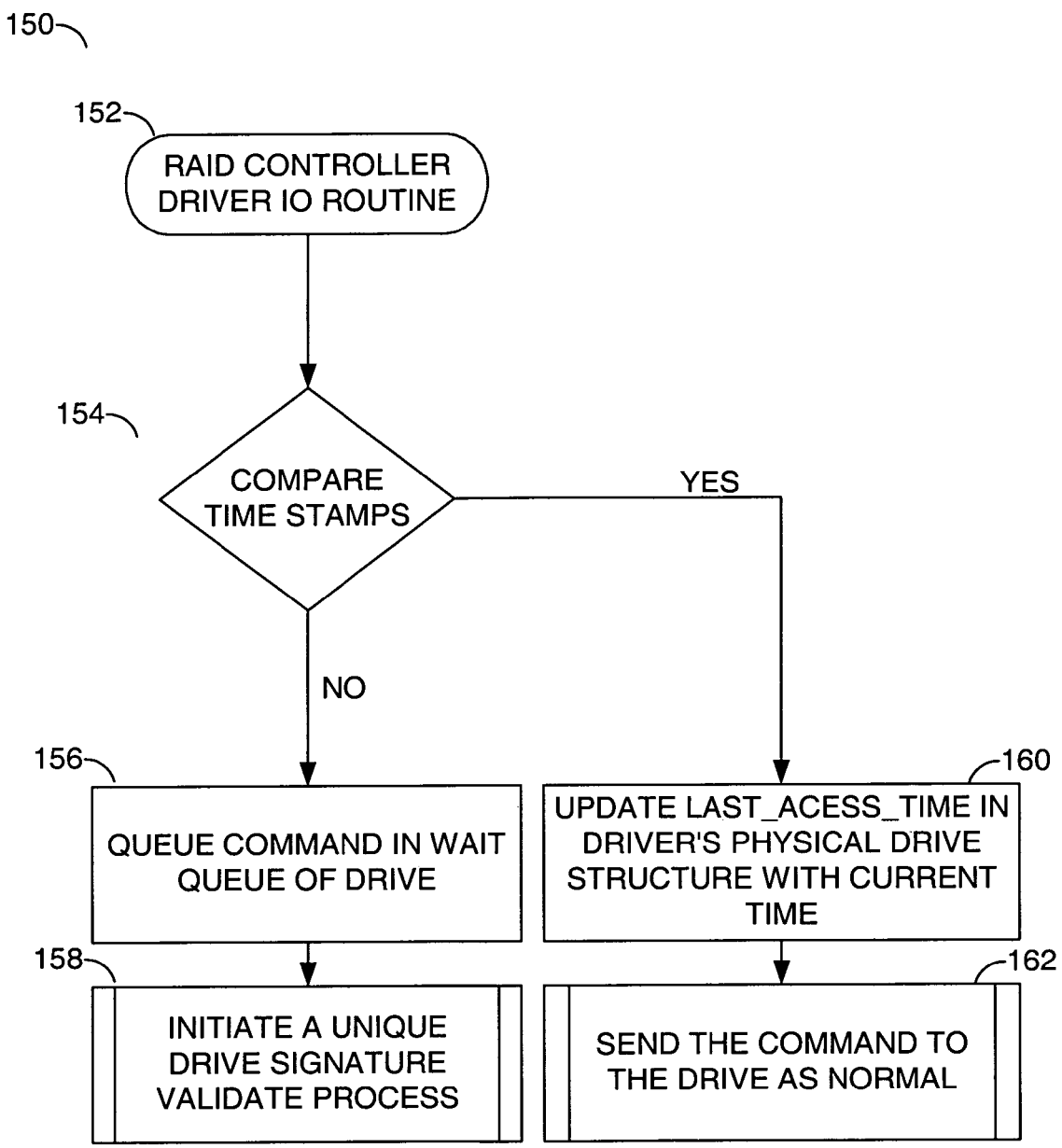
FIG. 3 is a flow diagram of a signature creation process.

Referring to FIG. 3, a diagram of a process 150 is shown implementing a procedure for the creation of a unique drive signatures in the BIOS/driver of the controller 60. The process 150 may also be used with reading the drive signature while the driver is loading. The process 150 generally comprises a state 152, a decision state 154, a state 156, a state 158, a state 160 and a state 162. The state 152 generally starts a RAID controller driver IO routine. The decision state 154 compares time stamps by determining if the parameter current_time is greater than the parameter last_access_time plus the parameter practical_drive_replacement time. If so, the method 150 moves to the state 160. If not, the method moves to the state 156. The state 156 queues an IO command in the wait queue of the particular one of the drives 80a-80n. Next, the state 158 initiates a unique drive signature validation process (to be described in connection with FIG. 4). The state 160 updates the parameter last_access_time stored in the physical drive structure with the parameter current_time. Next, the state 162 sends the command to the particular one of the drives 80a-80n as normal. The parameter practical_drive_replacement_time represents the time needed to physically replace a drive in a RAID system. By reducing this time, the driver generally improves the efficiency of drive replacement detection.

Before sending any IO commands to the drives 80a-80n, the state 154 checks if the parameter current_time is more than the parameter last_access_time plus the parameter practical_drive_replacement_time. If so, the process 150 does not send the command to the drives 80a-80n. Instead, the IO command is sent to the waiting queue and the process 150 initiates unique drive signature check process 158.

Figure 4:
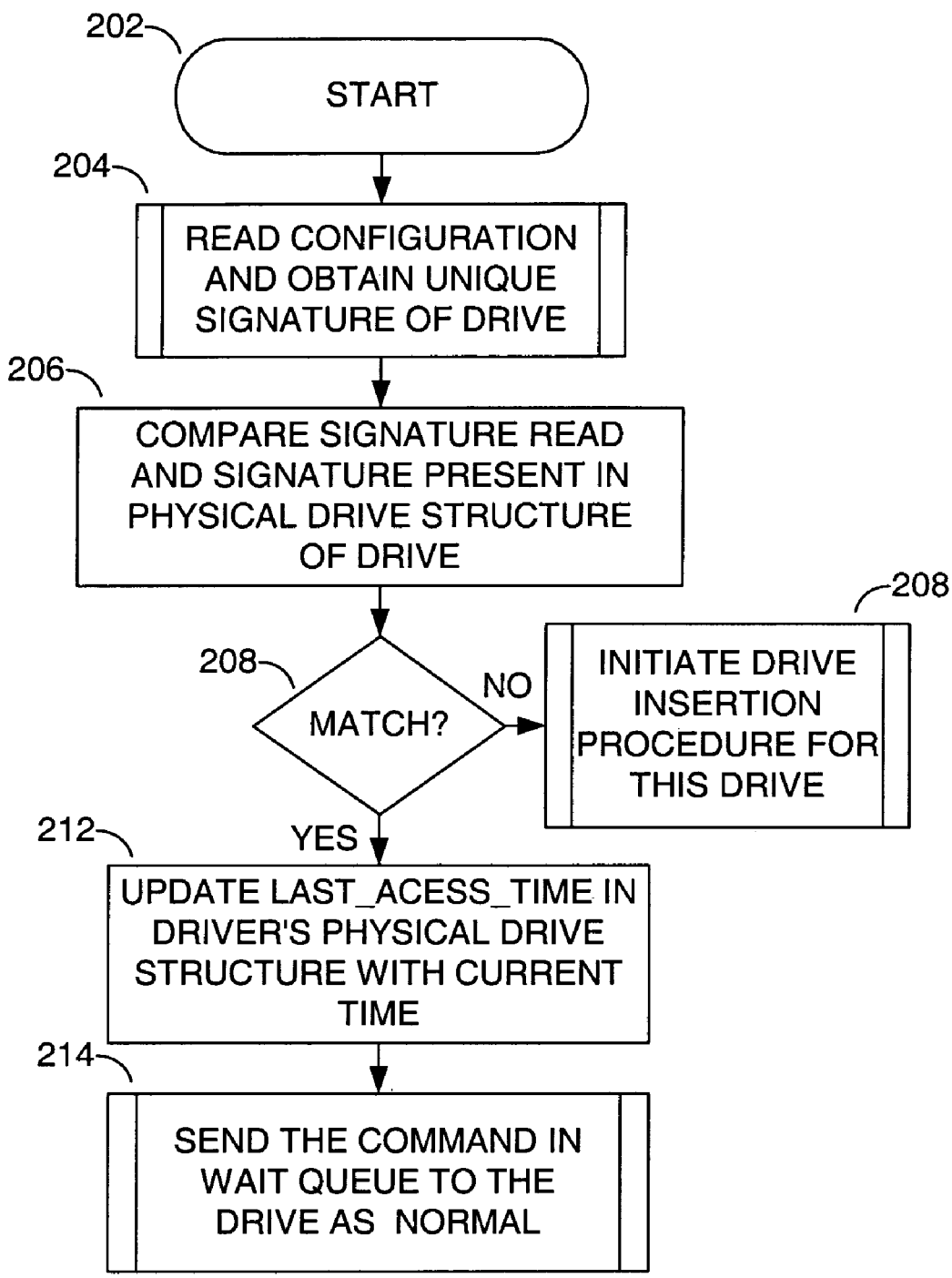
FIG. 4 is a diagram of a signature validation process.

Referring to FIG. 4, a diagram illustrating the process 158 for implementing a signature verification is shown. The process 158 is normally implemented in the IO Routine of the drive and unique drive signature validation process 150. The process 158 generally comprises a state 202, a state 204, a state 206, a decision state 208, a state 210, a state 212 and a state 214. The state 202 may be a start state. The state 204 may read a configuration and obtain a unique signature for a particular one of the drives 80a-80n. The state 206 compares the signature read with the signature present on the physical drive structure stored in the particular one of the drives 80a-80n. The decision state 208 determines if the signatures match. If the signatures do not match, the state 210 initiates a drive insertion procedure for the particular drive 80a-80n being configured. If the signatures do match, the state 212 updates the parameter last_access_time in the physical drive structure with the parameter current_time. The state 214 sends the command in the wait queue to the particular drive 80a-80n being configured as normal.

In general, the drive signature check process 158 reads the configuration from one of the drives 80a-80n and compares the configuration with the unique drive signature stored in the physical drive structure of the particular one of the drives 80a-80n. If both the signatures are same, the process 158 sends the command in the waiting queue to the drive and updates the parameter last_access_time in the physical drive structure of the particular one of the drives with the current time. If both of the signatures are not same, the process 158 considers the drive as a newly inserted drive and takes appropriate action. If the parameter driver_receive_time is less than the parameter last_access_time plus the parameter practical_drive_replacement_time, then the process 150 sends the command to the drive and updates the parameter last_access_time in the physical drive structure of the drive with the parameter current_time.

With the present invention, a drive change in a RAID system may be detected automatically and efficiently. The methods discussed will not affect the normal IO routine while under heavy IO since the present invention initiates a drive_signature_check_process only if one of the drives 80a-80n is idle for more than a specific duration (e.g., the parameter practical_drive_replacement_time). The present invention will prevent data corruption if a user removes and inserts a new drive when the system is idle. The present invention generally helps improve the integrity of a RAID system. The present invention may be implemented with no major IO performance hits, and/or data corruption issues during a drive replacement. While the present invention has been described in the context of software for RAID drivers, the present invention may also be used in RAID firmware, external RAID implementations, etc.

The function performed by the flow diagram of FIGS. 2-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a disk array configured to send and receive data from a controller, said disk array comprising a plurality of disk drives each configured to store a drive signature; and
    said controller is configured to (i) receive a data signal and one or more address signals and (ii) write data to said disk array, wherein said controller (a) checks said drive signature of a particular drive before writing said data when a current time is greater than a last access time plus a drive replacement time, (b) writes said data to said disk array without checking said drive signature when said current time is less than said last access time plus said drive replacement time, (c) does not affect said sending and receiving while under an input/output load when said writes occurs without checking said drive signature and (d) said controller determines whether said current time is greater than said last access time plus said drive replacement time before each data write.

2. The apparatus according to claim 1, wherein each of said drive signatures comprises a unique drive signature.

3. The apparatus according to claim 2, wherein said drive signature comprises a plurality of bits configured to store information selected from the group consisting of (i) an adapter model, (ii) a drive model, (iii) a slot number and (iv) the time when a particular configuration was created.

4. The apparatus according to claim 1, wherein said drive signature is generated by a basic input/output subroutine of said controller.

5. The apparatus according to claim 1, wherein said controller implements said checking of said drive signature in a software driver stored on said controller.

6. The apparatus according to claim 1, wherein said controller considers said particular drive a newly inserted drive in a driver when said drive signature changes between checks.

7. The apparatus according to claim 1, wherein said check of said drive signature by said controller ensures data integrity during a drive replacement operation.

8. An apparatus comprising:
    means for implementing a disk array configured to send and receive data from a controller, said disk array comprising a plurality of disk drives each configured to store a drive signature; and
    means for implementing said controller configured to (i) receive a data signal and one or more address signals and (ii) write data to said disk array, wherein said controller (a) checks said drive signature of a particular drive before writing said data when a current time is greater than a last access time plus a drive replacement time, (b) writes said data to said disk array without checking said drive signature when said current time is less than said last access time plus said drive replacement time, (c) does not affect said sending and receiving while under an input/output load when said writing occurs without checking said drive signature, and (d) said controller determines whether said current time is greater than said last access time plus said drive replacement time before each data write.

9. The apparatus according to claim 8, wherein said drive signature is generated by a basic input/output subroutine of said controller.

10. The apparatus according to claim 9, wherein said drive signature comprises a plurality of bits configured to store information selected from the group consisting of (i) an adapter model, (ii) a drive model, (iii) a slot number and (iv) the time when a particular configuration was created.

11. The apparatus according to claim 8, wherein said controller implements said checking of said drive signature in a software driver stored on said controller.

12. The apparatus according to claim 8, wherein said controller considers said particular drive a newly inserted drive in a driver when said drive signature changes between checks.

13. The apparatus according to claim 8, wherein said check of said drive signature by said controller ensures data integrity during a drive replacement operation.

14. A method for implementing a drive replacement in a drive array comprising the steps of:
    (A) implementing a disk array configured to send and receive data from a controller, said disk array comprising a plurality of disk drives each configured to store a drive signature; and
    (B) implementing said controller configured to (i) receive a data signal and one or more address signals and (ii) write data to said disk array, in response to one or more I/O commands, wherein said controller (a) checks said drive signature of a particular drive before writing said data when a current time is greater than a last access time plus a drive replacement time, (b) writes said data to said disk array without checking said drive signature when said current time is less than said last access time plus said drive replacement time, (c) does not affect said sending and receiving while under an input/output load when said writing occurs without checking said drive signature and (d) said controller determines whether said current time is greater than said last access time plus said drive replacement time before each data write.

15. The method according to claim 14, wherein said method checks said drive signature before sending address signals or data to said drive.

16. The method according to claim 14, wherein said drive signature is generated by a basic input/output subroutine of said controller.

17. The method according to claim 15, wherein said drive signature comprises a plurality of bits configured to store information selected from the group consisting of (i) an adapter model, (ii) a drive model, (iii) a slot number and (iv) the time when a particular configuration was created.

18. The method according to claim 17, wherein said controller implements said checking of said drive signature in a driver stored on said controller.

19. The method according to claim 14, wherein said controller considers said particular drive a newly inserted drive in a driver when said drive signature changes between checks.

20. The method according to claim 14, wherein said check of said drive signature by said controller ensures data integrity during a drive replacement operation.

* * * * *